United States Patent
Xu et al.

(10) Patent No.: US 11,687,095 B2
(45) Date of Patent: Jun. 27, 2023

(54) METHOD, RELATED SYSTEM, AND READABLE STORAGE MEDIUM RELATED TO ROBOT SERVICE

(71) Applicant: BOE TECHNOLOGY GROUP CO., LTD., Beijing (CN)

(72) Inventors: Bo Xu, Beijing (CN); Xiaojun Tang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 577 days.

(21) Appl. No.: 16/762,323

(22) PCT Filed: Dec. 5, 2019

(86) PCT No.: PCT/CN2019/123290
§ 371 (c)(1),
(2) Date: May 7, 2020

(87) PCT Pub. No.: WO2020/140682
PCT Pub. Date: Jul. 9, 2020

(65) Prior Publication Data
US 2021/0208593 A1    Jul. 8, 2021

(30) Foreign Application Priority Data
Jan. 2, 2019    (CN) .......................... 201910001378.6

(51) Int. Cl.
*G06F 21/00*    (2013.01)
*G05D 1/02*    (2020.01)
(Continued)

(52) U.S. Cl.
CPC ......... *G05D 1/0291* (2013.01); *G05D 1/0219* (2013.01); *G05D 1/0246* (2013.01);
(Continued)

(58) Field of Classification Search
CPC .. G05D 1/0219; G05D 1/0246; G05D 1/0274; G05D 1/0291; G06K 9/6218
See application file for complete search history.

(56) References Cited

U.S. PATENT DOCUMENTS

| | | | |
|---|---|---|---|
| 2008/0046125 A1 | 2/2008 | Myeong et al. | |
| 2014/0172477 A1* | 6/2014 | Goulart | G06Q 10/06311 705/7.13 |
| 2019/0061156 A1* | 2/2019 | Li | G05D 1/0274 |

FOREIGN PATENT DOCUMENTS

| CN | 107049155 A | 8/2017 |
|---|---|---|
| CN | 107368079 A | 11/2017 |

(Continued)

*Primary Examiner* — Jeffrey C Pwu
*Assistant Examiner* — Thong P Truong
(74) *Attorney, Agent, or Firm* — The Webb Law Firm (57) ABSTRACT

The present disclosure relates to methods related to robot services, related systems, and readable storage media. According to some embodiments of the present disclosure, there is provided a method, including: acquiring images of an area to be served, wherein the area to be served includes serviceable grids obtained by performing equal-area grid division on the area to be served; performing pedestrian recognition on the images to acquire pedestrian heat of each serviceable grid within the preset time period; and marking a serviceable grid with the pedestrian heat exceeding a preset threshold and serviceable grids within a preset range centered on it as grids to be served, obtaining a sub-area to be served composed of the grids to be served.

15 Claims, 5 Drawing Sheets

(51) Int. Cl.
  *G06N 3/126* (2023.01)
  *G06V 40/10* (2022.01)
  *G06F 18/23* (2023.01)
  *G06V 10/762* (2022.01)
  *G06V 20/52* (2022.01)

(52) U.S. Cl.
  CPC ........... *G05D 1/0274* (2013.01); *G06F 18/23* (2023.01); *G06N 3/126* (2013.01); *G06V 10/762* (2022.01); *G06V 20/52* (2022.01); *G06V 40/10* (2022.01); *G05D 2201/0203* (2013.01)

(56) References Cited

FOREIGN PATENT DOCUMENTS

| | | | |
|---|---|---|---|
| CN | 107943058 | A | 4/2018 |
| CN | 108120441 | A | 6/2018 |
| CN | 108214492 | A | 6/2018 |
| CN | 108420371 | A | 8/2018 |
| CN | 108436921 | A | 8/2018 |
| CN | 108606728 | A | 10/2018 |
| CN | 108827309 | A | 11/2018 |
| CN | 109571482 | A | 4/2019 |
| WO | 2017198209 | A1 | 11/2017 |
| WO | 2018013538 | A1 | 1/2018 |

\* cited by examiner

FIG. 7

METHOD, RELATED SYSTEM, AND READABLE STORAGE MEDIUM RELATED TO ROBOT SERVICE

CROSS-REFERENCE TO RELATED APPLICATIONS

This application is the United States National Phase of PCT/CN2019/123290 and claims priority to Chinese Patent Application No. 201910001378.6 filed Jan. 2, 2019, the disclosures of which are hereby incorporated by reference in their entirety.

TECHNICAL FIELD

This disclosure relates to the field of computer technology. More particularly, it relates to a method, related system, and a readable storage medium related to robot service.

BACKGROUND

At present, the multi-service robot service route planning method is usually to adopt the average distribution method for an area to be served. It is simply to divide the area by equal area and then conduct full coverage route planning to provide full service, regardless of whether each location of the area requires the service. This method cannot identify the location of the area with service demand and performs route planning and service for it, which has low service efficiency and wastes energy consumption.

SUMMARY

According to some embodiments of the present disclosure, there is provided a method, including: acquiring images of an area to be served, wherein the area to be served includes serviceable grids obtained by performing grid division on the area to be served; performing pedestrian recognition on the images to acquire pedestrian heat of each serviceable grid within a preset time period; and marking a serviceable grid with the pedestrian heat exceeding a preset threshold and serviceable grids within a preset range centered on it as grids to be served, obtaining a sub-area to be served composed of the grids to be served.

According to some embodiments of the present disclosure, the method further includes: allocating a corresponding number of serviceable grids to each of a plurality of service robots to obtain a service area corresponding to each service robot; and determining an intersection of the sub-area to be served and the service area corresponding to each service robot, taking a service robot with the largest intersection as the service robot serving the sub-area to be served.

According to some embodiments of the present disclosure, the method further includes: generating a service route for the service robot.

According to some embodiments of the present disclosure, the allocating a corresponding number of serviceable grids to each of the plurality of service robots includes allocating an equal number of serviceable grids to each of the plurality of service robots.

According to some embodiments of the present disclosure, the method further includes: constructing the area to be served, and performing equal-area grid division on the area to be served to acquire the serviceable grids.

According to some embodiments of the present disclosure, the marking a serviceable grid with the pedestrian heat exceeding a preset threshold and serviceable grids within a preset range centered on it as grids to be served, obtaining a sub-area to be served further includes: marking the serviceable grid with the pedestrian heat exceeding the preset threshold and the serviceable grids within the preset range centered on it as the grids to be served, grouping the grids to be served by a clustering method, and forming a sub-area to be served according to edge grids in each group.

According to some embodiments of the present disclosure, the forming a sub-area to be served according to edge grids in each group further includes: for each group, forming the sub-area to be served for the group by taking all serviceable grids covered by the polygon area wrapped by a connecting line of centers of the edge grids in the group as the grids to be served for the group.

According to some embodiments of the present disclosure, the generating a service route for the service robot further includes: if a certain service robot serves as a service robot that serves at least two sub-areas to be served, obtaining an optimal service sequence for the at least two sub-areas to be served by the service robot by genetic algorithm calculation.

According to some embodiments of the present disclosure, the performing pedestrian recognition on the images to acquire pedestrian heat of each serviceable grid within a preset time period further includes: performing pedestrian recognition on the images within the preset time period to obtain a number of pedestrians in each serviceable grid at each moment within the preset time period; and performing integration within the preset time period on an average number of pedestrians in each serviceable grid within the preset time period respectively to obtain the pedestrian heat of each serviceable grid.

According to some embodiments of the present disclosure, there is provided a system, including: a pedestrian heat acquisition module configured to acquire images of an area to be served, wherein the area to be served includes serviceable grids obtained by performing grid division on the area to be served, and to perform pedestrian recognition on the images to acquire pedestrian heat of each serviceable grid within a preset time period; and a to-be-served sub-area marking module configured to mark a serviceable grid with the pedestrian heat exceeding a preset threshold and serviceable grids within a preset range centered on it as grids to be served, obtaining a sub-area to be served composed of grids to be served.

According to some embodiments of the present disclosure, the system further includes: a serviceable grid division module configured to allocate a corresponding number of serviceable grids to each of a plurality of service robots to obtain a service area corresponding to each service robot; and a determination module configured to determine an intersection of the sub-area to be served and the service area corresponding to each service robot, take a service robot with a largest intersection as a service robot serving the sub-area to be served.

According to some embodiments of the present disclosure, the determination module is further configured to: generate a service route for the service robot.

According to some embodiments of the present disclosure, the serviceable grid division module is configured to allocate an equal number of serviceable grids to each of the plurality of service robots.

According to some embodiments of the present disclosure, the system further includes: a serviceable grid acquisition module configured to construct a map of the area to be served, and to perform equal-area grid division on the map of the area to be served to obtain the serviceable grids.

According to some embodiments of the present disclosure, the to-be-served sub-area marking module is configured to mark the serviceable grid with the pedestrian heat exceeding the preset threshold and the serviceable grids within the preset range centered on it as the grids to be served, group the grids to be served by a clustering method, and form a sub-area to be served according to edge grids in each group.

According to some embodiments of the present disclosure, the to-be-served sub-area marking module is further configured to form a sub-area to be served according to edge grids in each group by the following: for each group, forming the sub-area to be served for the group by taking all serviceable grids covered by a polygon area wrapped by a connecting line of centers of the edge grids in the group as the grid to be served for the group.

According to some embodiments of the present disclosure, the determination module is configured to, if a certain service robot serves as a service robot that serves at least two sub-areas to be served, obtain the optimal service sequence for the at least two sub-areas to be served by the service robot by genetic algorithm calculation.

According to some embodiments of the present disclosure, the pedestrian heat acquisition module is configured to perform pedestrian recognition on the images within the preset time period to obtain a number of pedestrians in each serviceable grid at each moment within the preset time period; and perform the integration within the preset time period on an average number of pedestrians in each serviceable grid within the preset time period respectively to obtain the pedestrian heat of each serviceable grid.

According to some embodiments of the present disclosure, there is provided a service system, which includes a plurality of service robots and the system described above.

According to some embodiments of the present disclosure, there is provided a computer-readable storage medium with a computer program stored thereon, the program, when executed by a processor, implements the method described above.

According to some embodiments of the present disclosure, there is provided a computer system including: a memory having a computer program stored thereon; and one or more processors configured to execute the computer program to perform the method as described above.

According to some embodiments of the present disclosure, there is provided a service robot including: a memory on which a computer program instruction is stored; and a processor coupled to the memory and configured to: receive the pedestrian heat of serviceable grids of a service area of the service robot, the serviceable grids being obtained by performing grid division on the service area, determine a number of serviceable grids with the pedestrian heat exceeding a preset threshold, determine whether the number exceeds a threshold, and cause the service robot to serve the service area in response to the number exceeding the threshold.

According to some embodiments of the present disclosure, the serviceable grids are acquired by performing equal-area grid division on the area to be served.

According to some embodiments of the present disclosure, there is provided a service robot including: a memory on which a computer program instruction is stored; and a processor coupled to the memory and configured to: receive information of a plurality of sub-areas to be served, wherein the plurality of sub-areas to be served are composed of serviceable grids with pedestrian heat exceeding a preset threshold, the serviceable grids being obtained by performing grid division on the area to be served including the plurality of sub-areas to be served, calculate a number of grids where the service area of the service robot intersects the plurality of sub-areas to be served, and determine the sub-area to be served with the largest number of intersecting grids as the service area of the service robot.

According to some embodiments of the present disclosure, the serviceable grids are obtained by performing equal-area grid division on the area to be served including the plurality of sub-areas to be served.

According to some embodiments of the present disclosure, the processor is further configured to: determine the sub-area to be served with the number of intersecting grids exceeding the threshold and with a highest number of intersecting grids as the service area of the service robot.

BRIEF DESCRIPTION OF THE DRAWINGS

The following describes the specific implementation of the present disclosure in further detail with reference to the accompanying drawings.

DETAILED DESCRIPTION

In order to explain the disclosure more clearly, the disclosure will be further described below with reference to preferred embodiments and drawings. Similar parts in the drawings are denoted by the same reference numerals. Those skilled in the art should understand that the content specifically described below is illustrative rather than restrictive, and should not be used to limit the protection scope of the present disclosure.

Overview

This disclosure relates to methods, systems, and media related to service robots.

A method according to some embodiments of the present disclosure may include: acquiring images of an area to be served, wherein the area to be served includes serviceable grids obtained by performing equal-area grid division on the area to be served; and then performing pedestrian recognition on the images to acquire pedestrian heat of each serviceable grid within the preset time period; and marking a serviceable grid with the pedestrian heat exceeding a preset threshold and serviceable grids within a preset range centered on it as grids to be served, obtaining a sub-area to be served composed of the grids to be served.

This novel method for determining the sub-area to be served takes into account pedestrian heat, so as to be able to effectively determine areas that are really necessary to be served, and areas that are not necessary to be served can be avoided from being determined as areas to be served, which improves the efficiency of service and saves unnecessary energy consumption.

The method according to some embodiments of the present disclosure may further include: allocating a corresponding number of serviceable grids to each of the plurality of service robots to obtain a service area corresponding to each service robot; and determining an intersection of the sub-area to be served and a service area corresponding to each service robot, taking a service robot with the largest intersection as a service robot serving the sub-area to be served.

This novel method for allocating service robots takes into account that the size of the intersection between the sub-area to be served and the service area corresponding to each service robot is determined to be different, then takes the service robot with the largest intersection as the service robot serving the sub-area to be served, so as to be able to determine the most suitable service robot to serve the sub-area to be served based on the changes of the sub-area to be served, which further improves the efficiency of service and saves energy consumption.

The method according to some embodiments of the present disclosure may further include: generating a service route for the service robot. The service route is generated based on the sub-area to be served, thereby further improving the efficiency of service and saving energy consumption.

The services can be cleaning services, sales services, consulting services, etc.

The method illustrated below includes a plurality of steps, and those skilled in the art can understand that one or more of the plurality of steps may be omitted. In some cases, more steps can also be added.

Figure 1:
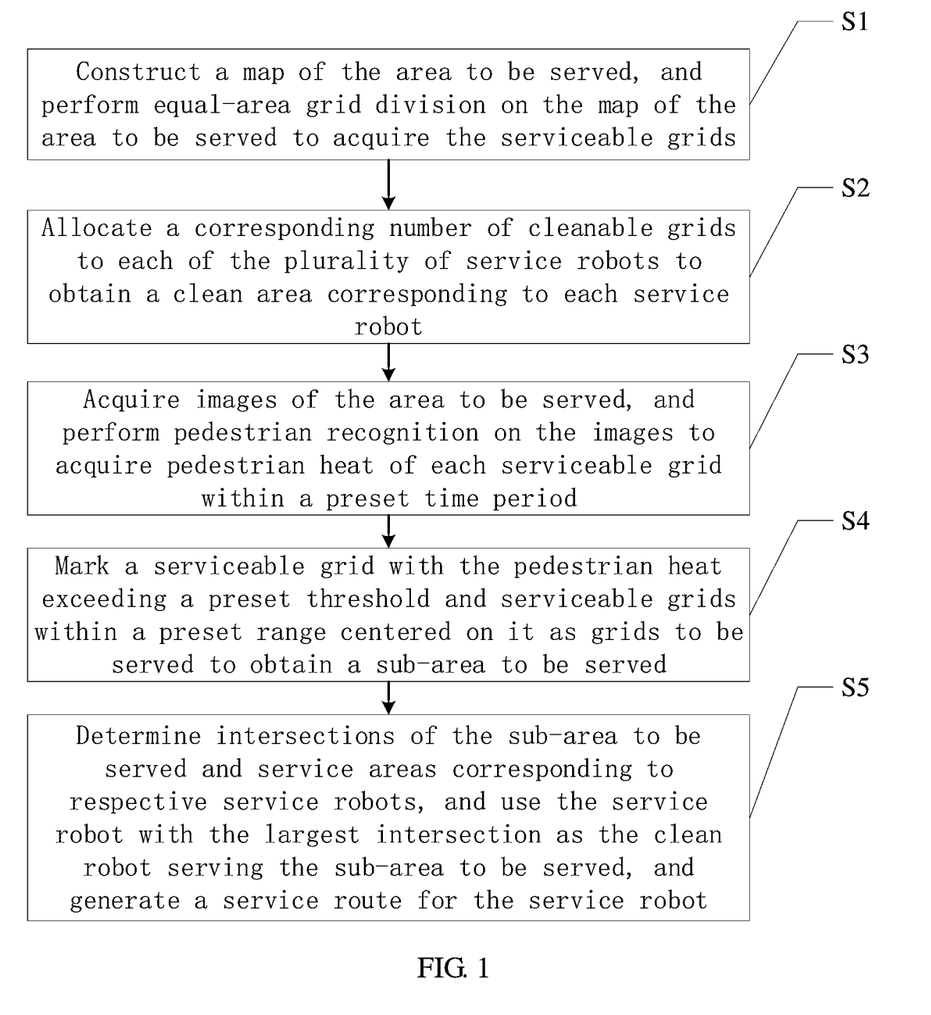
FIG. 1 shows a flowchart of a service robot route planning method provided by an embodiment of the present disclosure.

As shown in FIG. 1, one embodiment of the present disclosure provides a service robot route planning method, including:

S1. Construct a map of the area to be served, and perform equal-area grid division on the map of the area to be served to acquire the serviceable grids;

S2. Allocate a corresponding number of serviceable grids to each of the plurality of service robots arranged in the area to be served to obtain a service area corresponding to each service robot.

Figure 2:
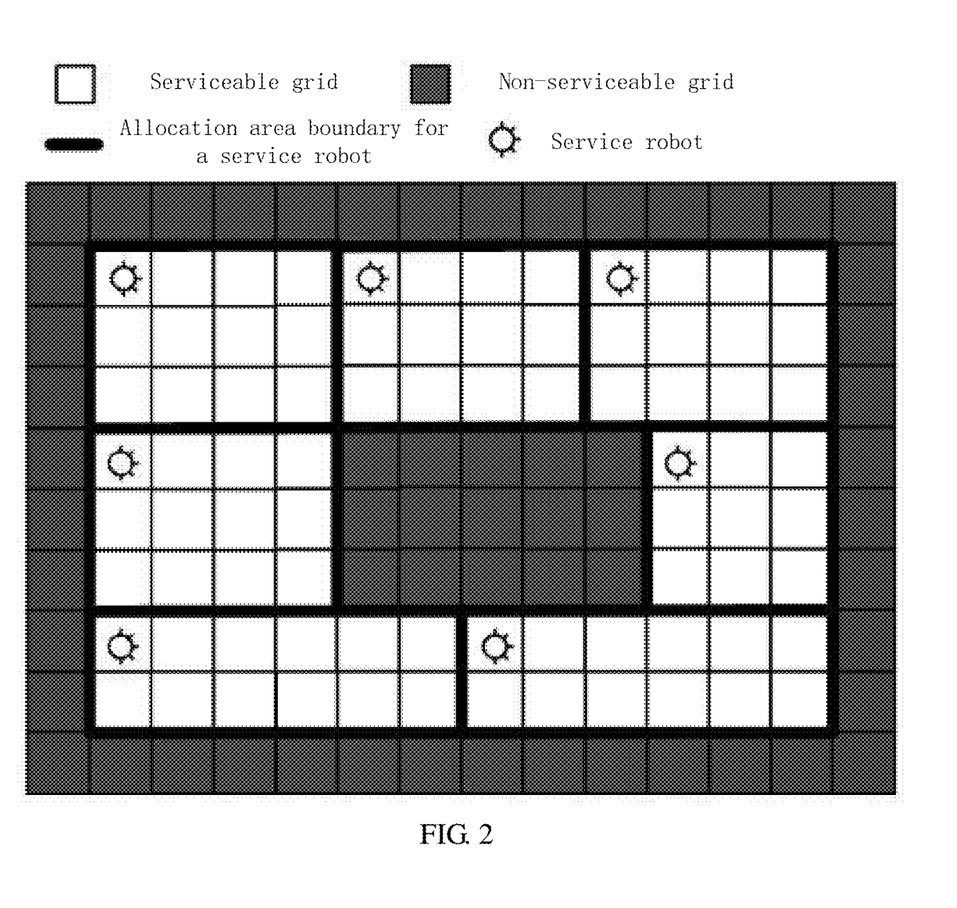
FIG. 2 shows a schematic diagram of performing grid division on a map of areas to be served and allocation of serviceable grids for multiple service robots.

In a specific example, as shown in FIG. 2, assuming that the area to be served is a shopping mall, the plane map of the shopping mall is equally divided into multiple grids, where the serviceable grids are for example shopping mall aisles, etc., and the non-serviceable grids are for example businesses stores, cabinets, etc., each service robot is allocated to a service area composed of the same number and adjacent serviceable grids. It is understandable that, since the number of serviceable grids is not necessarily an integer multiple of the number of service robots, therefore, if the number of serviceable grids is an integer multiple of the number of service robots, the same number means it should be absolutely the same, otherwise it should be approximately the same. In FIG. 2, for ease of illustration, it is shown that each of the plurality of service robots is allocated a service area composed of an equal number (for example, 12) of serviceable grids, but those skilled in the art can understand that each of the service robots can be allocated a service area composed of a different number of serviceable grids.

Figure 3:
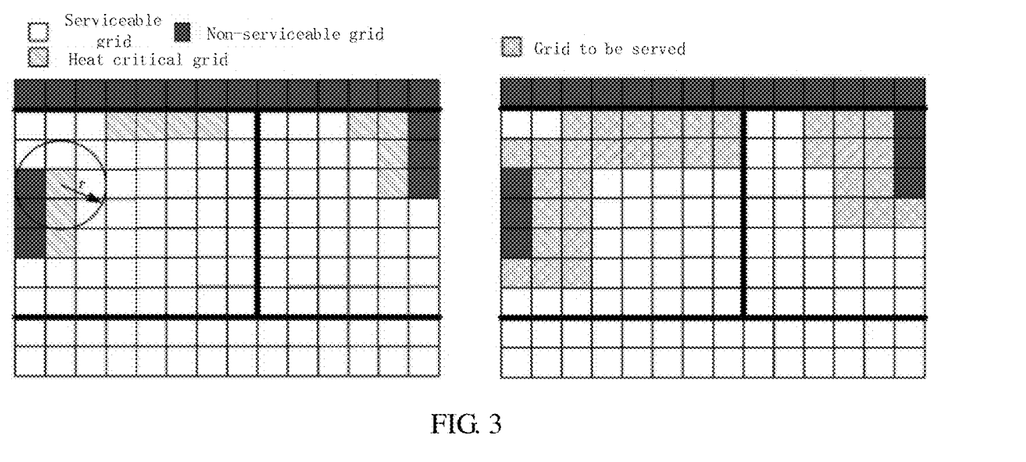
FIG. 3 shows a schematic diagram of marking a grid to be served.

S3. Acquire images of the area to be served, and perform pedestrian recognition on the images to acquire pedestrian heat of each serviceable grid within a preset time period;

S4. Mark a serviceable grid with the pedestrian heat exceeding a preset threshold and serviceable grids within a preset range centered on it as grids to be served to obtain a sub-area to be served; in one specific example, as shown in 3, the serviceable grids with the pedestrian heat exceeding the preset threshold can be first marked as heat critical grids, and then serviceable grids within the radius r centered on each heat critical grid and the heat critical grid itself are marked as the grids to be served, obtaining a sub-area to be served composed of these adjacent grids to be served. There are two sub-areas to be served shown in FIG. 3.

Figure 4:
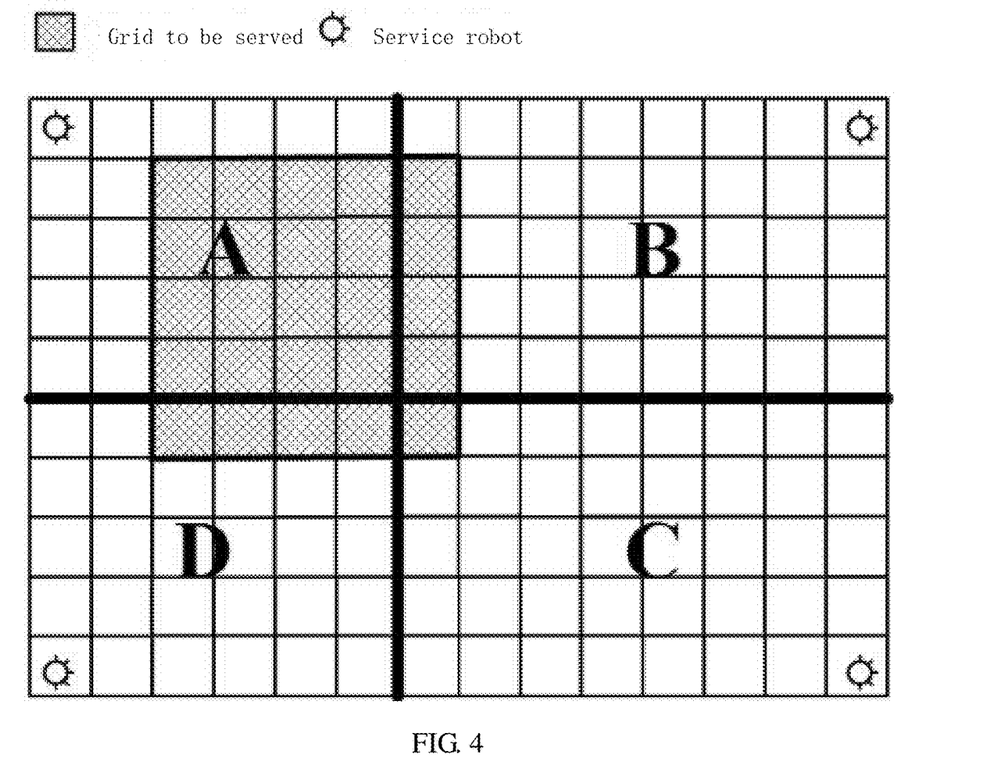
FIG. 4 is a schematic diagram showing the intersection of the sub-area to be served and the service area corresponding to each service robot.

S5. Determine intersections of the sub-area to be served and the service areas corresponding to respective service robots, use the service robot with the largest intersection as the service robot serving the sub-area to be served, and generate a service route for the service robot. In one specific example, as shown in FIG. 4, the service area corresponding to the service robot in the upper left corner is A, and the intersection between the sub-area to be served and the service area A is the largest, therefore, the service robot in the upper left corner is regarded as the service robot serving the sub-area to be served.

The service robot route planning method provided in this embodiment, after dividing the map of area to be served and identifying the serviceable grids therein, allocates corresponding service areas to multiple service robots, acquires the pedestrian heat in the serviceable grids according to the number of pedestrians of the serviceable grids identified from the images, and uses the pedestrian heat as the basis for judging the degree of dirtiness of the serviceable grids, and because the pedestrian traffic of the serviceable grids around the serviceable grid with high pedestrian heat will inevitably increase after a preset period of time, the serviceable grid with pedestrian heat exceeding the preset threshold and serviceable grids within a preset range centered on it are marked as the grids to be served, thereby expanding the service scope, and obtaining the sub-area to served. In this way, the obtained sub-area to be served comprises relatively continuous serviceable grids, which avoids over-dispersion and facilitates route planning. Finally, by means of the service robot with the largest intersection with the sub-area to be served only serving the sub-area to be served and not serving all the serviceable grids, it can be realized that, after judging the degree of dirtiness in different areas, targeted local service is conduct, which effectively avoids serving unnecessary area locations, thereby improving efficiency and saving energy consumption.

In some optional implementations of this embodiment, performing pedestrian recognition on the images to acquire pedestrian heat of each serviceable grid within a preset time period in step S3 further includes:

performing pedestrian recognition on the images within the preset time period to obtain the number of pedestrians in each serviceable grid at each moment within the preset time period;

performing the integration within the preset time period on the average number of pedestrians in each serviceable grid within the preset time period respectively to obtain the pedestrian heat of each serviceable grid.

In one specific example, multiple cameras can be set in the area to be served to ensure that all serviceable grids can be covered. Images collected by multiple cameras are used for pedestrian recognition on the frame basis (by means of feature recognition of pedestrians' heads, etc.). For each serviceable grid, calculate the average number n of pedestrians in a certain serviceable grid within a unit time period t, and then perform integration within the time period t to obtain the pedestrian heat h of the serviceable grid. Assuming that the total number of frames of image acquisition within the unit time period t is p, then the pedestrian heat of this serviceable grid within unit time period t is $h=\int_t n \, dt$, and the pedestrian heat is the cumulative value of the number of pedestrians over time.

In some optional implementations of this embodiment, step S4 "marking a serviceable grid with the pedestrian heat exceeding a preset threshold and serviceable grids within a preset range centered on it as a grid to be served, obtaining a sub-area to be served" further includes:

marking serviceable grids with the pedestrian heat exceeding the preset threshold and serviceable grids within the preset range centered on it as grids to be served, grouping the grids to be served by a clustering method, and forming a sub-area to be served according to edge grids in each group.

With this implementation, it is ensured that the grid to be served in each sub-area to be served is relatively concentrated and avoids non-continuous grids from being present in the sub-areas to be served, thereby ensuring that the route is relatively short when the service robot performs services, and facilitating to plan its service route in the sub-area to be served.

In some optional implementations of this embodiment, the grouping the grids to be served by the clustering method, and forming a sub-area to be served according to edge grids in each group further include:

grouping the grids to be serviced according to a preset clustering radius and a minimum number of grids to be served in a group, and forming a sub-area to be served according to edge grids in each group.

With this implementation, it avoids the occurrence of sub-areas to be served that contain too few grids to be served, and further avoids the situation where the delineation of sub-areas to be served is more dispersive.

Figure 5:
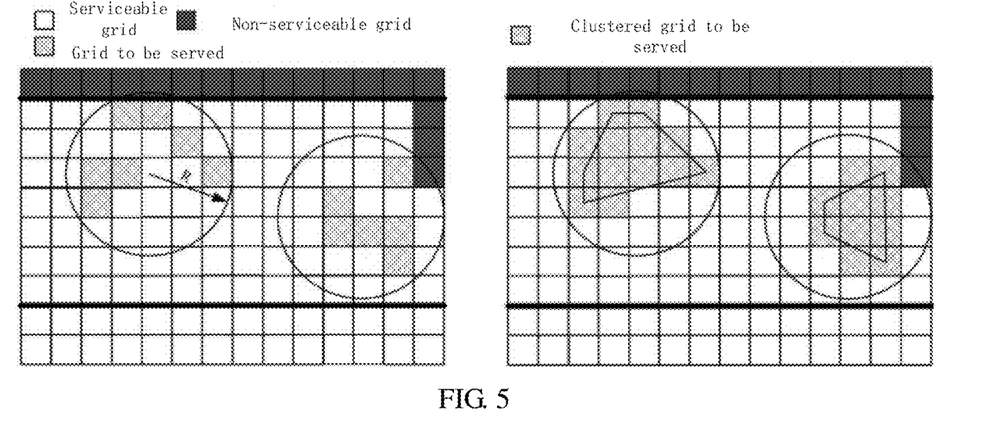
FIG. 5 shows a schematic diagram of grouping grids to be served by a clustering method and forming sub-areas to be served according to edge grids in each group.

In one specific example, as shown in FIG. 5, since the serviceable grids may be more dispersedly distributed, it may happen at this time that some grids to be served in the sub-area to be served responsible by a certain service robot are far away from most other grids to be served in the same sub-area to be served, and are more closer to grids to be served in other sub-area to be served, which is not conducive to improving service efficiency and saving energy consumption. Therefore, in this implementation, after the grids to be served are marked, the grids are grouped by a clustering method according to a preset clustering radius R and a minimum number m of the grids to be served in a group; for each group, by connecting the edge grids in a certain group, taking all the serviceable grids covered by the polygon area wrapped by a connecting line of centers of the edge grids in the group as the grids to be served of the group, the sub-area to be served for the group is formed.

In some optional implementations of this embodiment, the generating a service route for the service robot described in step S5 further includes: if a certain service robot serves as a service robot that serves at least two sub-areas to be served, the optimal service sequence for the at least two sub-areas to be served by the service robot is obtained by genetic algorithm calculation, wherein the genetic algorithm may be an existing general genetic algorithm.

With this implementation, it is possible to reasonably plan the service sequence of each sub-area to be served by the service robot that is responsible for performing services for at least two sub-areas to be served, which is beneficial to the reasonable generation of the service route for the service robot.

In some optional implementation of this embodiment, the generating a service route for the service robot described in step S5 further includes: acquiring a center to-be-served grid of the sub-area to be served, and setting the service robot to perform counterclockwise internal spiral service centered on the center to-be-served grid when performing service.

With this implementation, the service robot can be prevented from reciprocating in the same route in the generated service route, which can further improve service efficiency and save energy consumption. In addition, the counterclockwise inner spiral conforms to the pedestrian walking habit, which can reduce the impact of service robot movement on pedestrians. Wherein, the inner spiral represents the spiral movement from outside to inside. When being responsible for more than two sub-areas to be served, each sub-area to be served is sequentially provided with a counterclockwise inner spiral service, and the service sequence of the sub-areas to be served can be calculated by genetic algorithm.

In some optional implementation of this embodiment, the method further includes: counting a period in which the total pedestrian heat of the area to be served is the lowest in each period of each day, and the route planning method in this period is that all service robots serve their respective service areas, that is, provide a full service for the area to be served.

Figure 6:
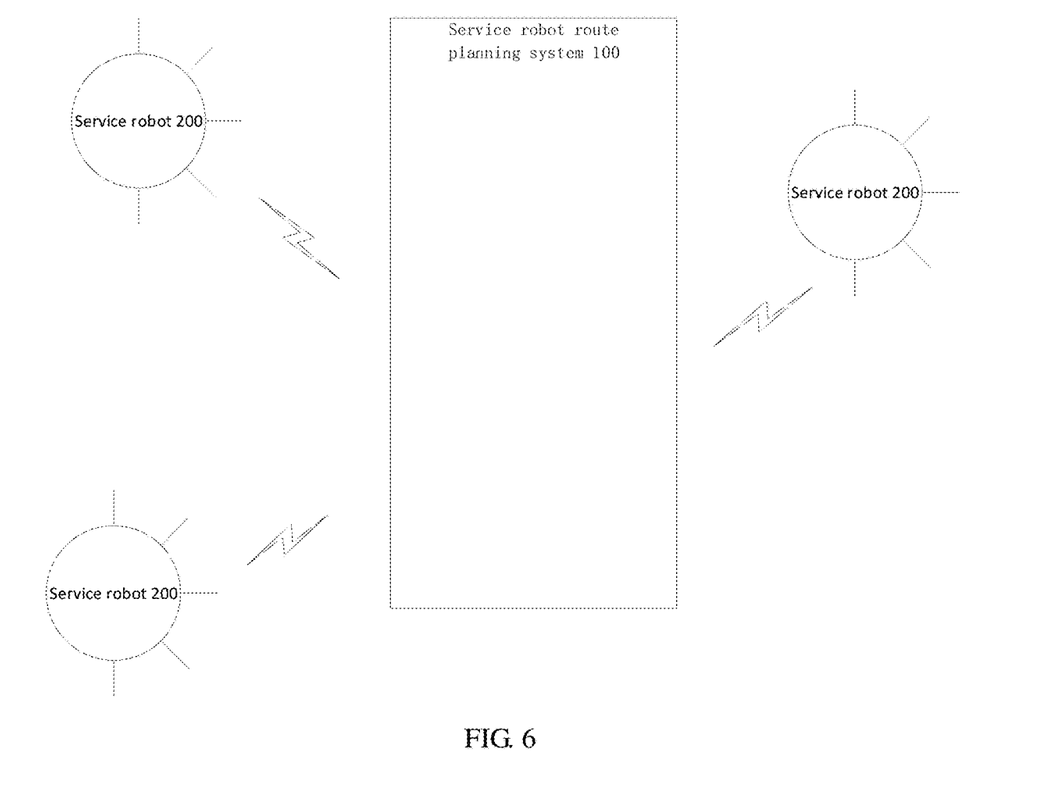
FIG. 6 shows a schematic diagram of a service system provided by an embodiment of the present disclosure.

As shown in FIG. 6, another embodiment of the present disclosure provides a service system, including a service robot route planning system 100 and a plurality of service robots 200;

Wherein, the service robot route planning system 100 includes:

A serviceable grid acquisition module 101 configured to construct a map of an area to be served, and to perform equal-area grid division on the map of the area to be served to obtain serviceable grids;

A serviceable grid division module 102 configured to allocate a corresponding number of serviceable grids to each of the plurality of service robots to obtain a service area corresponding to each service robot;

A pedestrian heat acquisition module 103 configured to acquire images of the area to be served, and perform pedestrian recognition on the images to acquire pedestrian heat of each serviceable grid within a preset time period;

A to-be-served sub-area marking module 104 configured to mark a serviceable grid with pedestrian heat exceeding a preset threshold and serviceable grids within a preset range centered on it as grids to be served, obtaining a sub-area to be served;

A determination module 105 configured to determine the intersections of the sub-area to be served and the service areas corresponding to respective service robots, take the service robot with the largest intersection as the service robot serving the sub-area to be served, and generate a service route for the service robot.

The service robot 200 is configured to serve the sub-area to be served according to the service route instruction generated by the service robot route planning system 100.

In some embodiments of the present disclosure, the service robot may include, for example, a memory storing a computer program and a processor. The processor may execute the computer program to cause the service robot to perform the method of the embodiment of the present disclosure.

For example, the service robot can receive the pedestrian heat in the serviceable grid of the service area of the service robot. As described above, the serviceable grid may be obtained by performing grid division on the service area. The service robot may determine the number of serviceable grids with pedestrian heat exceeding a preset threshold, determine whether the number exceeds a threshold, and in response to the number exceeding the threshold, cause the service robot to serve this service area. For example, suppose that the service robot is responsible for a certain service area containing 12 grids, when it is determined based on the received pedestrian heat information that the number of grids with pedestrian heat exceeding the threshold is 7, which exceeds the threshold, for example 6, then the service robot is caused to start to serve the service area.

This solution enables service robots to perform necessary services based on pedestrian heat, avoiding unnecessary services, improving service efficiency, and saving energy consumption.

In other embodiments of the present disclosure, the service robot may include, for example, a memory storing a computer program and a processor. The processor may execute the computer program to cause the service robot to perform the methods of other embodiments of the present disclosure.

For example, a service robot can receive information of a plurality of sub-areas to be served. The plurality of sub-areas to be served may be composed of serviceable grids with pedestrian heat exceeding a preset threshold. As described above, the serviceable grids are obtained by performing grid division on the area to be served that includes the plurality of sub-areas to be served. The service robot may calculate the number of grids where the service area that the service robot is responsible intersects with the plurality of sub-areas to be served, and determine the sub-area to be served with the largest number of intersecting grids as the service area of the service robot. For example, assuming that the service area of the service robot has intersections with the three sub-areas to be served, then the sub-area to be served with the largest number of intersecting grids is determined as the service area of the service robot.

In some embodiments, the service robot determines the sub-area to be served that the number of intersecting grids exceeds the threshold and that the number of intersecting grids is highest as the service area of the service robot. That is, when the number of intersecting grids is the highest and exceeds the threshold, the corresponding sub-area to be served is determined as the service area of the service robot.

It should be noted that the principle and work flow of the service robot route planning system 100 in the service system provided by this embodiment are similar to the above service robot route planning method, and the related points can be referred to the above description, which will not be repeated here.

Figure 7:
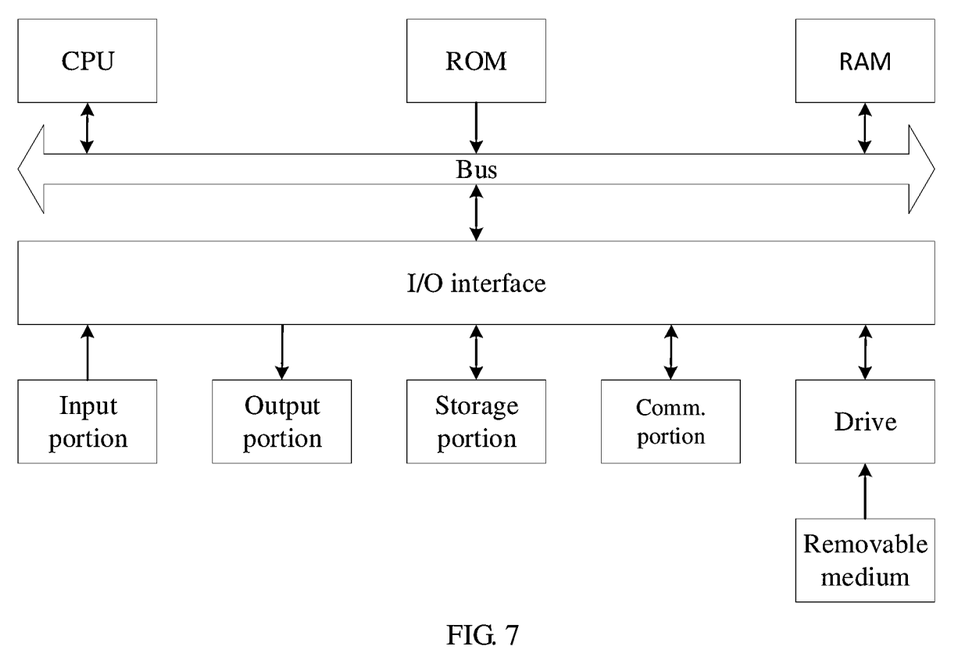
FIG. 7 shows a schematic structural diagram of a service robot route planning system provided by an embodiment of the present disclosure.

As shown in FIG. 7, the computer system suitable for implementing the service robot route planning system and the service robot provided by this embodiment includes a central processing unit (CPU), which can perform various appropriate actions and processes according to the program stored in the read-only memory (ROM) or the program loaded into the random access memory (RAM) from the storage. In the RAM, various programs and data necessary for the operation of the computer system are also stored. The CPU, ROM and RAM are connected to each other via a bus. An input/input (I/O) interface is also connected to the bus.

The following components are connected to the I/O interface: the input section including keyboard, mouse, etc.; the output portion including the liquid crystal display (LCD), and speakers etc.; the storage portion including a hard disk, etc.; and the communication portion including a network interface card such as LAN card, modem etc. The communication portion performs communication processing via a network such as the Internet. The drive is also connected to the I/O interface as needed. Removable media, such as magnetic disks, optical disks, magneto-optical disks, semiconductor memories, etc., are installed on the drive as needed, so that the computer program read out therefrom is installed into the storage portion as needed.

In particular, according to the present embodiment, the process described in the above flowchart can be implemented as a computer software program. For example, this embodiment includes a computer program product that includes a computer program tangibly contained on a computer-readable medium, and the above computer program includes program code for performing the method shown in the flowchart. In such an embodiment, the computer program may be downloaded and installed from the network through the communication portion, and/or installed from a removable medium.

The flowcharts and schematic diagrams in the drawings illustrate the architecture, functions, and operations of possible implementation of the system, method, and computer program product this embodiment. In this regard, each block in the flowchart or schematic diagram may represent a module, a program segment, or a piece of code. The above-mentioned module, program segment, or piece of code contains one or more executable instructions for implementing specified logical functions. It should also be noted that, in some alternative implementations, the functions labeled in the blocks can also occur in an order different from that in the drawings. For example, two blocks shown in succession can actually be executed in parallel, and sometimes they can also be executed in reverse order, depending on the functions involved. It should also be noted that each block in the schematic and/or flowchart, and combinations of blocks in the schematic and/or flowchart, can be implemented with a dedicated hardware-based system that performs the specified function or operation, or, it can be realized by a combination of dedicated hardware and computer instructions.

The modules described in this embodiment may be implemented in software or hardware. The described module can also be set in the processor. For example, it can be described as: a processor including a serviceable grid acquisition module, a serviceable grid division module, a pedestrian heat acquisition module, a to-be-served sub-area marking module and a determination module. Wherein, the names of these modules do not constitute a limitation on the module itself under certain circumstances.

As another aspect, this embodiment also provides a non-volatile computer storage medium. The non-volatile computer storage medium may be the non-volatile computer storage medium included in the above-described device in the foregoing embodiment, or it can be a non-volatile computer storage medium that is standalone and is not installed in the terminal. The above non-volatile computer storage medium stores one or more programs therewith, the above one or more programs, when executed by a device, cause the device to: construct a map of the area to be served, and perform equal-area grid division on the map of the area to be served to obtain serviceable grids; allocate a corresponding number of serviceable grids to each of the plurality of service robots to obtain a service area corresponding to each service robot; acquire an images of the area to be served, and perform pedestrian recognition on the images to acquire pedestrian heat of each serviceable grid within a preset time period; mark a serviceable grid with pedestrian heat exceeding a preset threshold and serviceable grids within a preset range centered on it as grids to be served to obtain a sub-area to be served; determine intersections of the sub-area to be served and the service areas corresponding to respective service robots, and use a service robot with the largest intersection as the service robot serving the sub-area to be served to generate a service route for the service robot.

It should be noted that in the description of the present disclosure, the terms "include", "contain" or any other variants thereof are intended to cover non-exclusive inclusion, so that a process, method, article or device including a series of elements not only includes those elements, but also include other elements that are not explicitly listed, or include elements inherent to this process, method, article, or device. Without more restrictions, the element defined by the sentence "include one . . . " does not exclude that there are other identical elements in the process, method, article or device that includes the element.

Obviously, the above-mentioned embodiments of the present disclosure are only examples for clearly illustrating the present disclosure, rather than limiting the embodiments of the present disclosure. For those of ordinary skill in the art, on the basis of the above-mentioned descriptions, other different forms of changes or modifications can also be made, and all implementations cannot be exhausted here, and any obvious changes or modifications derived from the technical solutions of the present disclosure are still within the protection scope of the present disclosure.

What is claimed is:

1. A method, comprising:
acquiring images of an area to be served within a preset time period, wherein the area to be served includes serviceable grids obtained by performing grid division on the area to be served;
performing pedestrian recognition on the images to acquire pedestrian heat of each serviceable grid within the preset time period;
marking a serviceable grid with the pedestrian heat exceeding a preset threshold and serviceable grids within a preset range centered on it as grids to be served;
obtaining a sub-area to be served composed of at least some of the grids to be served;
allocating a corresponding number of serviceable grids to each of a plurality of service robots to obtain a service area corresponding to each service robot; and
determining the intersections of the sub-area to be served and service areas corresponding to respective service robots, taking a service robot with a largest intersection as a service robot serving the sub-area to be served.

2. The method of claim 1, further comprising:
generating a service route for the service robot.

3. The method of claim 2, wherein the allocating a corresponding number of serviceable grids to each of the plurality of service robots includes allocating an equal number of serviceable grids to each of the plurality of service robots.

4. The method of claim 3, further comprising:
constructing a map of the area to be served, and performing equal-area grid division on the map of the area to be served to acquire the serviceable grids.

5. The method according to claim 2, wherein the generating a service route for the service robot further includes: if a certain service robot serves as a service robot that serves at least two sub-areas to be served, obtaining an optimal service sequence for the at least two sub-areas to be served by the service robot by genetic algorithm calculation.

6. The method according to claim 1, wherein the marking a serviceable grid with the pedestrian heat exceeding a preset threshold and serviceable grids within a preset range centered on it as grids to be served, and obtaining a sub-area to be served further includes:
marking the serviceable grid with the pedestrian heat exceeding the preset threshold and the serviceable grids within the preset range centered on it as the grids to be served,
grouping the grids to be served by a clustering method, and
forming a sub-area to be served for each group according to edge grids in the group.

7. The method according to claim 6, wherein the grouping the grids to be served by a clustering method and the forming a sub-area to be served for each group according to edge grids in the group further include:
grouping the grids to be serviced according to a preset clustering radius and a minimum number of grids to be served in a group, and
for each group, forming the sub-area to be served for the group by taking all serviceable grids covered by a polygon area wrapped by a connecting line of centers of the edge grids in the group as the grids to be served for the group.

8. The method according to claim 1, wherein the performing pedestrian recognition on the images to acquire pedestrian heat of each serviceable grid within a preset time period further includes:
performing pedestrian recognition on the images acquired within the preset time period to obtain a number of pedestrians in each serviceable grid at each moment within the preset time period;
performing integration within the preset time period on an average number of pedestrians in each serviceable grid within a unit time period within the preset time period respectively to obtain the pedestrian heat of each serviceable grid.

9. A non-transitory computer-readable storage medium having a computer program stored thereon, wherein, the program, when executed by a processor, implements the method according to claim 1.

10. A computer system, including:
a memory having a computer program stored thereon; and
one or more processors configured to execute the computer program to perform the method according to claim 1.

11. The computer system according to 10, wherein the processor is further configured to:
group the grids to be served by a clustering method according to a preset clustering radius and a minimum number of grids to be served in a group, and
for each group, forming the sub-area to be served for the group by taking all serviceable grids covered by a polygon area wrapped by a connecting line of centers of the edge grids in the group as the grids to be served for the group.

12. A service robot, including:
a memory on which a computer program instruction is stored; and
a processor coupled to the memory and configured to:
receive information of a plurality of sub-areas to be served, wherein the plurality of sub-areas to be served are composed of serviceable grids with pedestrian heat exceeding a preset threshold, the serviceable grids being obtained by performing grid division on the area to be served including the plurality of sub-areas to be served,
calculate a number of grids where the service area of the service robot intersects the plurality of sub-areas to be served, and
determine the sub-area to be served with a largest number of intersecting grids as the service area of the service robot.

13. The service robot according to claim 12, wherein the serviceable grids are obtained by performing equal-area grid division on the area to be served including the plurality of sub-areas to be served.

14. The service robot according to claim 12, wherein the processor is further configured to:
determine the sub-area to be served with the number of intersecting grids exceeding the threshold and with a highest number of intersecting grids as the service area of the service robot.

15. A service system, comprising a plurality of service robots and a computer system according to claim 10.

\* \* \* \* \*